United States Patent
Bi (10) Patent No.: US 10,324,581 B2
(45) Date of Patent: Jun. 18, 2019

(54) MENU DISPLAY METHOD, APPARATUS AND SYSTEM (71) Applicant: Alibaba Group Holding Limited, Grand Cayman (KY)

(72) Inventor: Bo Bi, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/620,113

(22) Filed: Jun. 12, 2017

(65) Prior Publication Data

US 2017/0357404 A1 Dec. 14, 2017

(30) Foreign Application Priority Data

Jun. 14, 2016 (CN) .......................... 2016 1 0417047

(51) Int. Cl.
*G06F 3/0482* (2013.01)
*G06F 3/0481* (2013.01)

(52) U.S. Cl.
CPC ........ *G06F 3/04812* (2013.01); *G06F 3/0482* (2013.01); *G06F 2203/04803* (2013.01)

(58) Field of Classification Search
CPC combination set(s) only.
See application file for complete search history.

(56) References Cited

U.S. PATENT DOCUMENTS

| | | |
|---|---|---|
| 5,345,550 A | 9/1994 | Bloomfield |
| 5,546,522 A | 8/1996 | Nishida |
| 5,625,763 A | 4/1997 | Cirne |
| 5,625,783 A | 4/1997 | Ezekiel |
| 5,644,738 A | 7/1997 | Goldman |
| 5,689,666 A | 11/1997 | Berquist |
| 5,754,174 A | 5/1998 | Carpenter |
| 5,760,768 A | 6/1998 | Gram |
| 5,760,776 A | 6/1998 | McGurrin |
| 5,801,701 A | 9/1998 | Koppolu |
| 5,828,376 A | 10/1998 | Solimene |
| 5,838,317 A | 11/1998 | Bolnick |

(Continued)

OTHER PUBLICATIONS

International Search Report and Written Opinion for PCT/US2017/036997, dated Aug. 16, 2017.

(Continued)

*Primary Examiner* — Hien L Duong
(74) *Attorney, Agent, or Firm* — Sheppard Mullin Richter & Hampton LLP (57) ABSTRACT The present disclosure provides a menu display method, apparatus and system, wherein the method includes: displaying a main menu on a user interface, the main menu including multiple main options; displaying, in response to one main option being selected by an input indicator, a submenu corresponding to the one main option, the submenu including a sub-option corresponding to the one main option; and enabling a shielding region corresponding to the one main option, the shielding region configured to shield an operation on another main option in the shielding region by the input indicator, and the shielding region being generated according to the position of the one main option and adjacent to the one main option. The technical solution provided in the present application can flexibly respond to a menu operation, thus improving user experience.

21 Claims, 9 Drawing Sheets

(56) References Cited

U.S. PATENT DOCUMENTS

| | | | |
|---|---|---|---|
| 5,917,483 A | 6/1999 | Duncan | |
| 6,219,032 B1* | 4/2001 | Rosenberg | A63F 13/06 345/157 |
| 6,229,539 B1 | 5/2001 | Morcos | |
| 7,246,329 B1* | 7/2007 | Miura | G06F 3/0482 715/764 |
| 8,667,419 B2 | 3/2014 | Gorczowski | |
| 8,689,139 B2 | 4/2014 | Baird | |
| 8,756,529 B2 | 6/2014 | Ullmann | |
| 9,733,783 B1* | 8/2017 | Farrington | G06F 3/0481 |
| 2002/0052981 A1 | 5/2002 | Yasuda | |
| 2004/0165012 A1* | 8/2004 | Nelson | G06F 3/0482 715/828 |
| 2008/0072177 A1* | 3/2008 | Santos | G06F 3/0482 715/821 |
| 2008/0276200 A1* | 11/2008 | Bamford | G06F 3/0482 715/841 |
| 2010/0064258 A1* | 3/2010 | Gorczowski | G06F 3/0482 715/841 |
| 2011/0187724 A1* | 8/2011 | Oh | G06F 3/04815 345/473 |
| 2011/0320984 A1* | 12/2011 | Irani | G06F 3/0482 715/841 |
| 2013/0326421 A1* | 12/2013 | Jo | G06F 3/0482 715/841 |
| 2014/0082557 A1 | 3/2014 | Warner | |
| 2014/0380358 A1 | 12/2014 | White | |
| 2017/0262156 A1* | 9/2017 | Xing | G06F 3/0482 |

OTHER PUBLICATIONS

PCT International Preliminary Report on Patentability dated Dec. 27, 2018, issued in related International Application No. PCT/US2017/036997, (11 pages).

\* cited by examiner

| Main option 1 | Sub-option 1 | Sub-option 2 |
| Main option 2 | Sub-option 3 | Sub-option 4 |
| Main option 3 | Sub-option 5 | Sub-option 6 |
| Main Option 4 | Sub-option 7 | Sub-option 8 |
| Main option 5 | Sub-option 9 | Sub-option 10 |
| Main option 6 | Sub-option 11 | Sub-option 12 |
| Main option 7 | Sub-option 13 | Sub-option 14 |
| Main option 8 | | |

MENU DISPLAY METHOD, APPARATUS AND SYSTEM

CROSS REFERENCE TO RELATED APPLICATION

The present application is based on and claims the benefit of priority to Chinese Application No. 201610417047.7, filed on Jun. 14, 2016, the entire contents of which are incorporated herein by reference.

TECHNICAL FIELD

The present application relates to the field of computer technologies, and in particular, to a menu display method, apparatus and system.

BACKGROUND

In the field of computer technologies, a menu may refer to a list of options appearing on a display screen when a computer program is in progress, a list of service items, and so on. In general, the menu includes a main menu and a submenu, the main menu includes multiple menu main options, and the submenu includes sub-options corresponding to the menu main options.

Figure 1:
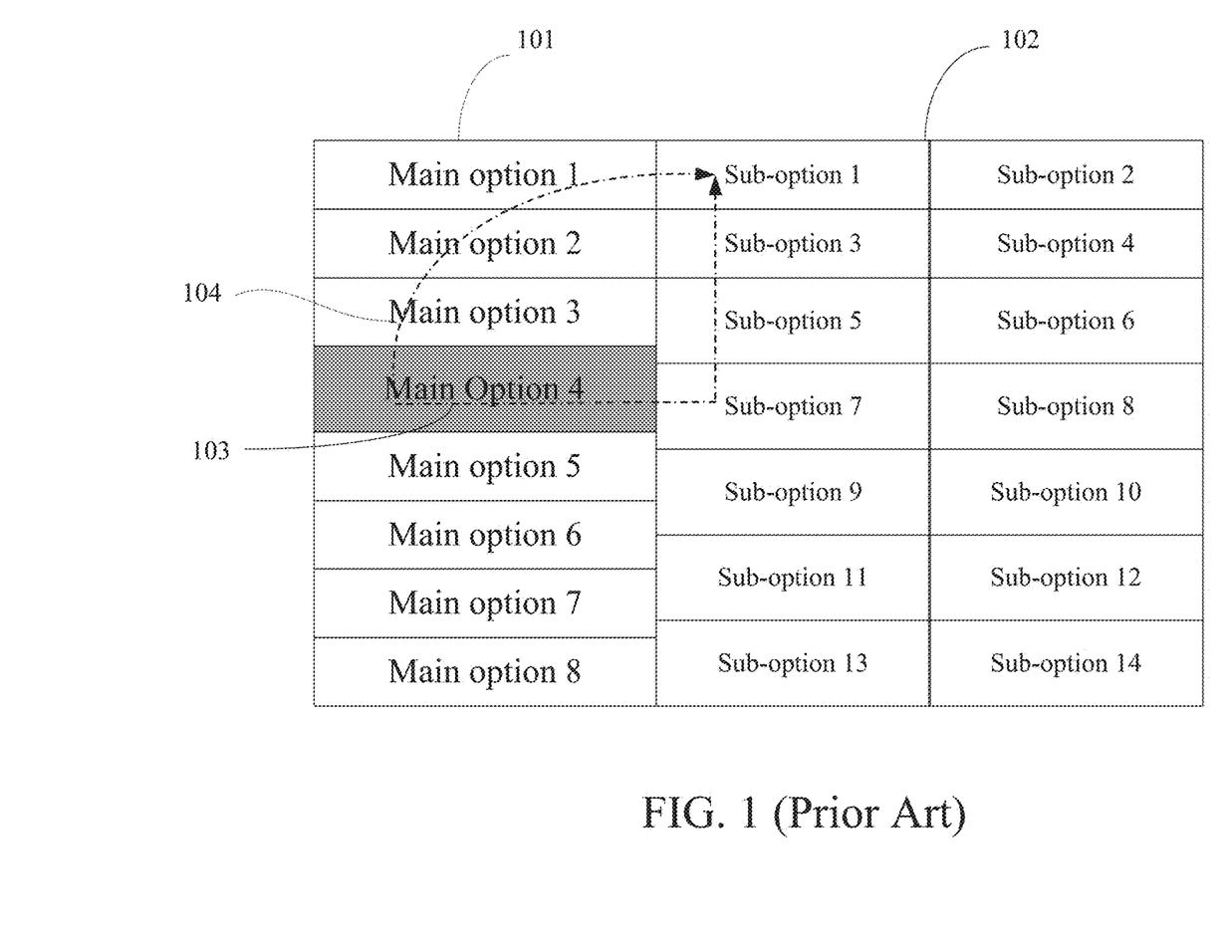
FIG. 1 is a schematic diagram of webpage menu display in the prior art.

Taking a webpage menu shown in FIG. 1 as an example, the menu includes a main menu 101 (the main menu 101 displays 8 main options); a user operates the menu to select a main option 4, and a submenu 102 may correspondingly display sub-options corresponding to the main option (the submenu 102 displays 14 sub-options corresponding to the main option 4); to further select one sub-option, the user needs to move the cursor along a particular trajectory to the position of the sub-option.

As shown in FIG. 1, to select a sub-option 1, the user needs to move the cursor horizontally into the submenu to select the sub-option 1, as shown by a movement trajectory of a cursor 103. However, in an actual user operation, the movement trajectory of the cursor is often random, for example, the user may operate the cursor along a curve, and as a result, the cursor may pass through positions of other main options when the user moves the cursor.

As shown by a movement trajectory 104 of a cursor in FIG. 1, the cursor would pass through positions of a main option 3, a main option 2, and a main option 1 during movement; since the current menu display method displays corresponding sub-options according to a main option at which the cursor hovers, as the user moves the cursor 104, the submenu may be sequentially updated to content of the submenu corresponding to the main option 3, content of the submenu corresponding to the main option 2, and content of the submenu corresponding to the main option 1; thus, within a few microseconds to several seconds during the movement of the cursor, the submenu may be updated multiple times, and the updated content is not the content that the user really cares about, which greatly affects user experience.

The trigger operations for the other main options during the movement of the cursor are, in essence, caused by unconscious cursor operations of the user, and are not the real intention of the user's operation. Therefore, such display manner of frequently and blindly responding to the cursor operation may seriously affect the normal operation of the user and extremely limit operation modes of the user, causing poor user experiences.

SUMMARY

An objective of the present application is to provide a menu display method, which can flexibly respond to a menu operation and improve user experience.

In addition, the present application further provides a menu display apparatus and system, to ensure application and implementation of the above method in practice.

In a first aspect of the present application, a menu display system is provided, the system including:

at least one memory and at least one processor, an operable instruction being stored in the at least one memory, the at least one processor being configured to read and execute the operable instruction in the at least one memory, and the operable instruction including:

displaying a main menu on a user interface, the main menu including multiple main options;

displaying, in response to one main option being selected by an input indicator, a submenu corresponding to the one main option, the submenu including one or more sub-options corresponding to the one main option; and enabling a shielding region corresponding to the one main option, the shielding region configured to shield an operation on another main option in the shielding region by the input indicator, and the shielding region being generated according to the position of the one main option and adjacent to the one main option.

In a second aspect of the present application, a menu display method is provided, the method including:

displaying a main menu on a user interface, the main menu including multiple main options;

displaying, in response to one main option being selected by an input indicator, a submenu corresponding to the one main option, the submenu including one or more sub-options corresponding to the one main option; and enabling a shielding region corresponding to the one main option, the shielding region configured to shield all operations in the shielding region by the input indicator, and the shielding region being generated according to the position of the one main option and adjacent to the one main option.

In a third aspect of the present application, another menu display method is provided, the method including:

displaying a main menu on a user interface, the main menu including multiple main options;

displaying, in response to one main option being selected by an input indicator, a submenu corresponding to the one main option, the submenu including one or more sub-options corresponding to the one main option; and selecting, from a pre-established list of shielding regions, a shielding region corresponding to the one main option, and enabling the selected shielding region, the shielding region configured to shield an operation on another main option in the shielding region by the input indicator, corresponding relationships between the main options and the shielding regions being stored in the list of shielding regions, and the shielding region being generated according to the position of the one main option and adjacent to the one main option.

In a fourth aspect of the present application, a menu display apparatus is provided, the apparatus including:

a main menu display unit, configured to display a main menu on a user interface, the main menu including multiple main options;

a submenu display unit, configured to display, in response to one main option being selected by an input indicator, a submenu corresponding to the one main option, the submenu including one or more sub-options corresponding to the one main option; and a shielding region enable unit, configured to enable a shielding region corresponding to the one main option, the shielding region configured to shield an operation on another main option in the shielding region by the input indicator, and the shielding region being generated according to the position of the one main option and adjacent to the one main option.

In a fifth aspect of the present application, another menu display apparatus is provided, the apparatus including:

a main menu display unit, configured to display a main menu on a user interface, the main menu including multiple main options;

a submenu display unit, configured to display, in response to one main option being selected by an input indicator, a submenu corresponding to the one main option, the submenu including one or more sub-options corresponding to the one main option; and a shielding region selection and enable unit, configured to select, from a pre-established list of shielding regions, a shielding region corresponding to the one main option, and enable the selected shielding region, the shielding region configured to shield an operation on another main option in the shielding region by the input indicator, corresponding relationships between the main options and the shielding regions being stored in the list of shielding regions, and the shielding region being generated according to the position of the one main option and adjacent to the one main option.

Compared with the prior art, the present application has the following beneficial effects:

The present application displays a main menu on a user interface; displays, in response to one main option selected by an input indicator, a submenu corresponding to the one main option; and then enables a shielding region corresponding to the one main option, the shielding region configured to shield an operation on another main option in the shielding region by the input indicator, and the shielding region being generated according to the position of the one main option and adjacent to the one main option. The present application enables a shielding function of a shielding region mainly by using the shielding region established for the main option, to shield some operations of a user in the shielding region, thus avoiding some unconscious operations generated when a menu system blindly responds to an input indicator moved by the user, and reducing interference with the user's normal operation on the menu due to blindly responding to the operation of the input indicator, so as to improve user experience.

BRIEF DESCRIPTION OF THE DRAWINGS

In order to describe the technical solutions in embodiments of the present application more clearly, the accompanying drawings to be used in the description about the embodiments are introduced briefly in the following. It is apparent that the accompanying drawings in the following description are merely some embodiments of the present application, and those of ordinary skill in the art can further obtain other accompanying drawings according to the accompanying drawings without any creative efforts.

DETAILED DESCRIPTION

In order to make the invention objectives, features, and advantages of the present application more evident and comprehensible, the technical solutions in the embodiments of the present application are described below with reference to the accompanying drawings in the embodiments of the present application. It is apparent that the embodiments described are merely some embodiments rather than all embodiments of the present application. All other embodiments obtained by those of ordinary skill in the art based on the embodiments in the present application without creative efforts shall all fall within the protection scope of the present application.

Figure 2:
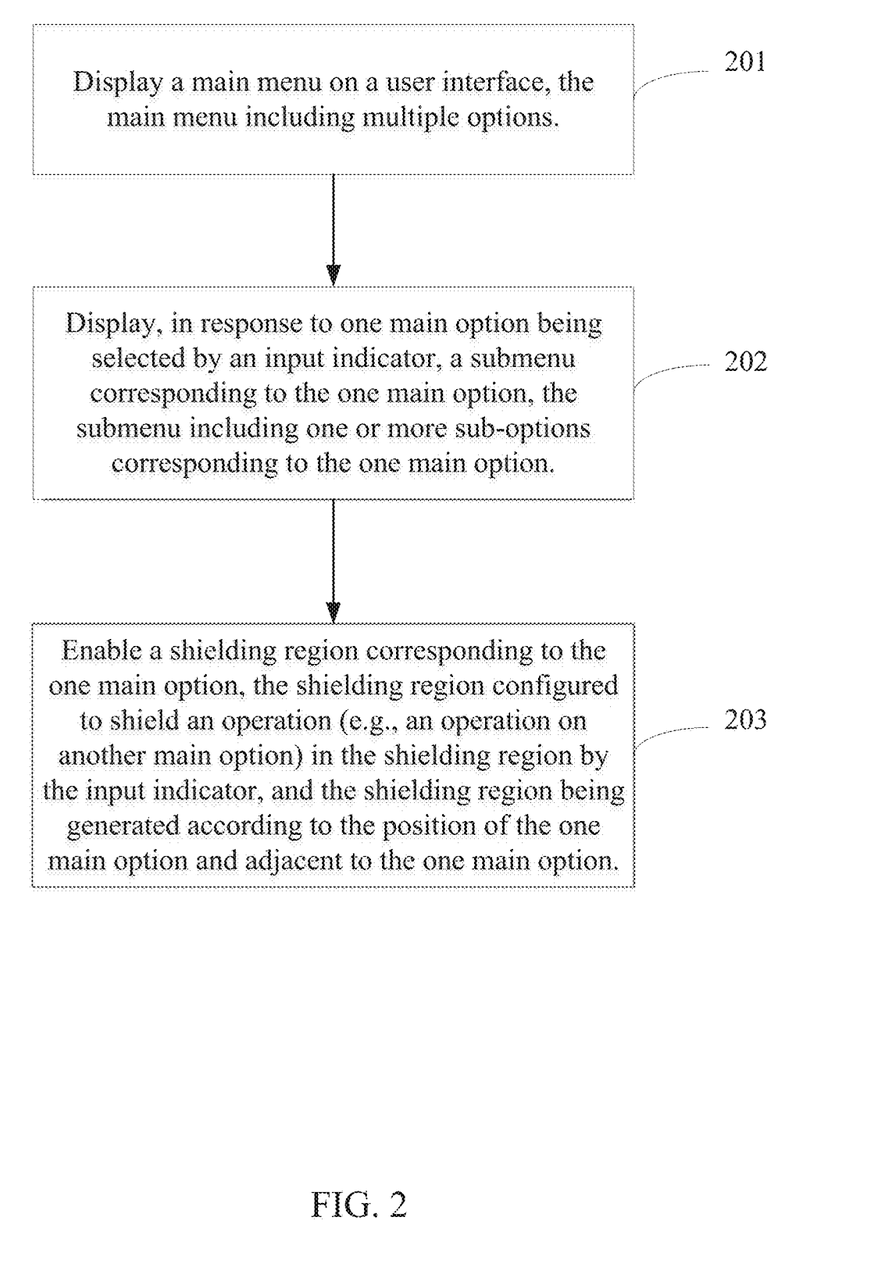
FIG. 2 is a flow chart of a first embodiment of a menu display method according to the present application.

Referring to FIG. 2, FIG. 2 is a flow chart of a first embodiment of a menu display method according to the present application. As shown in FIG. 2, the method may include:

Step 201: Display a main menu on a user interface, the main menu including multiple main options.

Step 202: Display, in response to one main option being selected by an input indicator, a submenu corresponding to the one main option, the submenu including one or more sub-options corresponding to the one main option.

Step 203: Enable a shielding region corresponding to the one main option, the shielding region configured to shield an operation (e.g., an operation on another main option) in the shielding region by the input indicator, and the shielding region being generated according to the position of the one main option and adjacent to the one main option. Here, "shielding an operation" may include shielding all operations in the shielding region.

Herein, in the embodiments of the present application, the shielding region may be implemented using a logical language, which can be construed as a region not embodied in the form of a page element, but having implemented a shielding effect through a back end logical algorithm. In some embodiments, the shielding region may also be implemented in the form of a page element, and the shielding region may be visible or invisible to the user.

For example, during implementation, the shielding region may be displayed with zero transparency. In this way, the shielding region is invisible to the user. As the user already has a viewing habit when operating a menu interface, the manner of setting the shielding region as invisible can improve effectiveness and flexibility of the menu display without affecting the user's viewing habit.

In order to facilitate those skilled in the art to understand the method shown in FIG. 2, implementation of the method is further explained below with reference to the schematic diagram of FIG. 2.

Figure 3:
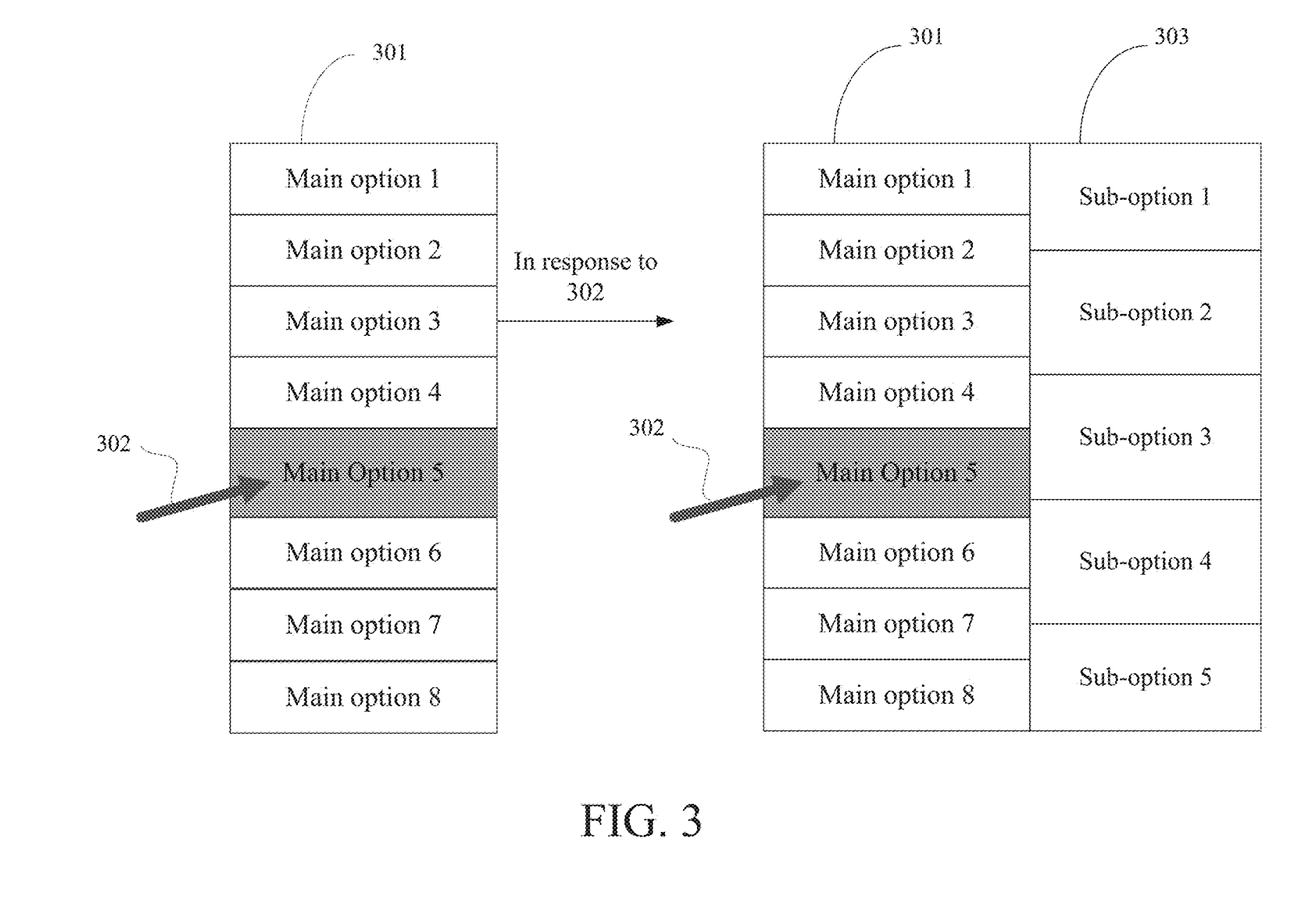
FIG. 3 is a schematic diagram of an implementation scenario of the first method embodiment shown in FIG. 1.

Referring to FIG. 3, FIG. 3 is a schematic diagram of an implementation scenario provided based on the first embodiment shown in FIG. 2. In FIG. 3, the reference sign 301 denotes a main menu, the reference sign 302 denotes an input indicator, and the reference sign 303 denotes a submenu; the main menu 301 is first displayed for a user, 8 main options are displayed on the main menu 301, and according to the position of 302, it is determined that the input indicator selects the main option 5; then, in response to the selection made by the input indicator, the submenu 303 corresponding to the main option 5 is displayed, and 5 sub-options related to the main option 5 are displayed in the submenu 303.

In the embodiments of the present application, the main menu and the submenu may be webpage elements. For example, effective and flexible menu display can be implemented by using the method according to the embodiments of the present application on an e-business website.

In the embodiments of the present application, the input indicator may be a mouse cursor, and may also be a pointer of a motion-sensor-based input device and the like.

In FIG. 3, the main menu 301 and the submenu 302 are laid out and displayed in a left-to-right arrangement at the same height. However, the embodiments of the present application do not limit the specific layout manner of the main menu and the submenu.

Figure 4:
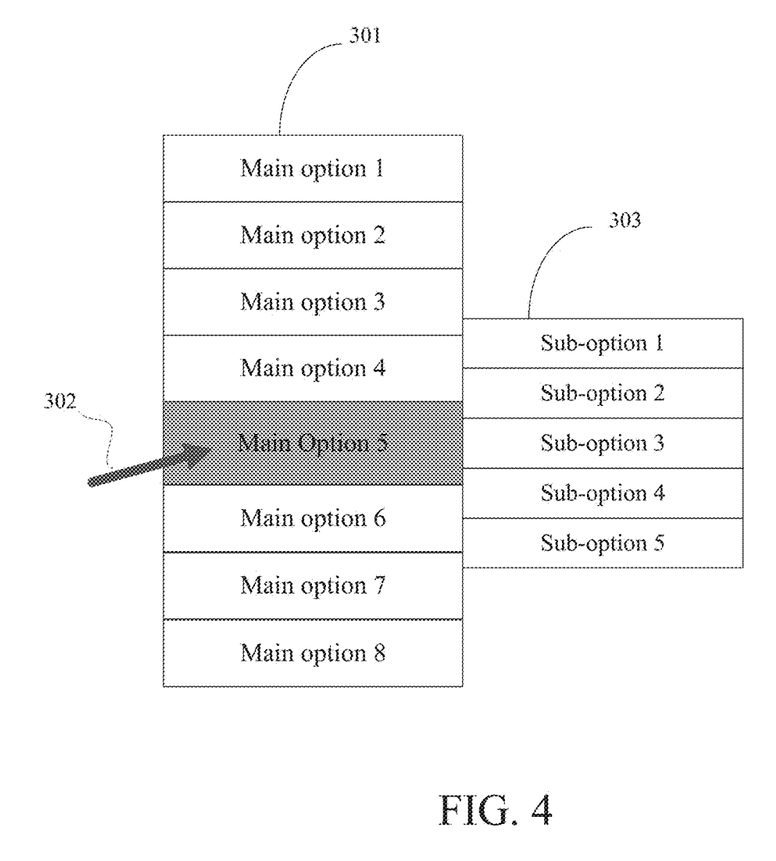
FIG. 4 is a schematic diagram of another implementation scenario of the first method embodiment shown in FIG. 1.

During implementation, the main menu and the submenu may also adopt a right-to-left layout manner, a top-to-bottom layout manner, or a bottom-to-top layout manner; the submenu may not be laid out in the manner shown in FIG. 3, and the size and the layout position of the submenu may be adjusted freely, for example, the submenu may use another layout manner shown in FIG. 4.

In some embodiments, the specific layout manner of the sub-options in the submenu is not limited to such a vertical arrangement form shown in FIG. 3 and FIG. 4, and may be another arrangement manner such as a horizontal or vertical-horizontal crisscross arrangement manner.

When the menu interface of FIG. 2 is displayed for the user, according to the method shown in FIG. 1, it is necessary to further enable a shielding region corresponding to the selected main option, and in the embodiments of the present application, enabling may refer to starting a shielding region to render a shielding effect. However, the shielding region may or may not be displayed on the menu in the form of a page element. In order to facilitate those skilled in the art to understand the implementation principle of the method, the shielding region is displayed below in the form of a page element with reference to FIG. 5.

Figure 5:
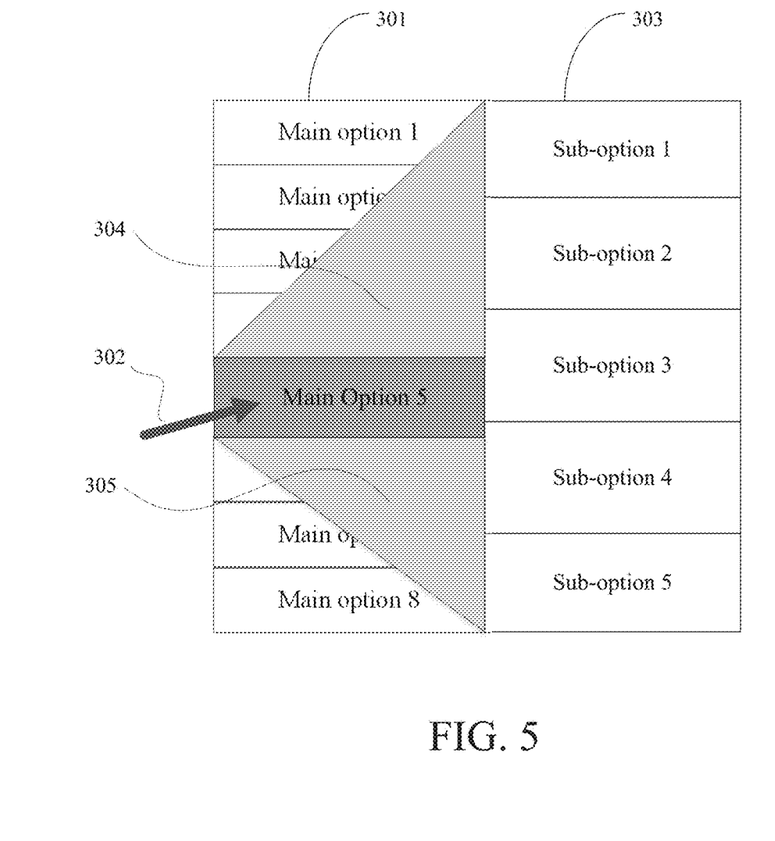
FIG. 5 is a schematic diagram of a shielding region in the scenario of FIG. 3.

In FIG. 5, the main option 5 corresponds to two shielding regions, which are a shielding region 304 above the main option 5 and a shielding region 305 below the main option 5, respectively. However, not each main option corresponds to two shielding regions, for example, the main option 1 may correspond to only a shielding region below; likewise, the main option 8 may correspond to only a shielding region above. No matter which main option it is, at least one shielding region corresponding thereto can be started correspondingly by using the method of the embodiments of the present application, to render a shielding effect.

In FIG. 5, the shielding regions 304 and 305 are triangular regions; during implementation, the shielding regions may also be fan-shaped regions or regions in other shapes, and the embodiments of the present application does not limit the specific shape of the shielding region, as long as the shielding region can implement the function thereof.

In the embodiments of the present application, the shielding region may render a shielding effect by shielding an operation of the input indicator 302 in the shielding region, that is, a moving operation of the input indicator 302 in the shielding region would not trigger the selection of other main options within the shielding range of the shielding region.

Referring to FIG. 5, when the input indicator 302 moves into the range of the shielding region 304, the input indicator 302 may move to and locate on a main option other than the main option 5, but the shielding region 304 will shield a selection operation of the input indicator 302 at this point, and the back end system will not receive the selection operation of 302, and consequently will not make a response.

As shown in FIG. 5, the shielding regions 304 and 305 of the main option 5 are both triangular regions, where positions of the shielding regions 304 and 305 are both determined according to an edge position of the main option 5.

For example, the position of the shielding region 304 is mainly determined according to an upper edge position of the main option 5, two vertices (defining one side) of the shielding region 304 can be determined according to the upper edge position of the main option 5, another vertex of the shielding region 304 can be determined according to an upper left corner vertex of the submenu, and after the vertex is determined, the other two sides of the shielding region 304 can also be determined.

In some embodiments, the another vertex of the triangle can also be determined according to an upper right vertex of another main option close to the main option 5, for example, the upper right vertex of the main option 1 can be used as the other vertex of 304.

Based on the same principle, the shielding region 305 can be determined.

In some embodiments of the present application, shielding regions only need to be established once. During implementations, shielding regions corresponding to main options may be pre-established for the main options on the main menu, a list of shielding regions may be generated, and a corresponding relationship between each main option and a corresponding shielding region may be recorded in the list of shielding regions.

During an implementation, the step 203 of enabling the shielding region corresponding to the one main option may include:

selecting, from a pre-established list of shielding regions, a shielding region corresponding to the one main option, and enabling the selected shielding region.

Such a manner of pre-establishing shielding regions, by performing an establishment operation in advance once and by using a stored list of shielding regions, saves time on dynamically establishing a shielding region for menu display, and can reduce a response time of the menu display.

In some embodiments, during an implementation, a shielding region corresponding to the main option may also be established when required by the menu display. In this case, during the implementation, the step 203 of enabling the shielding region corresponding to the one main option may include:

establishing, according to a layout position of the one main option on a page and a layout position of another main option close to the one main option, a shielding region corresponding to the main option, and enabling the established shielding region.

In order to further improve the effectiveness and flexibility of the menu display, an embodiment of the present application further provides another implementable method. In the following, on the basis of the method shown in FIG. 2, determination of the direction of the operation in the shielding region is added, to implement menu display-related processing more flexibly and more precisely. The method is explained below with reference to FIG. 6.

Figure 6:
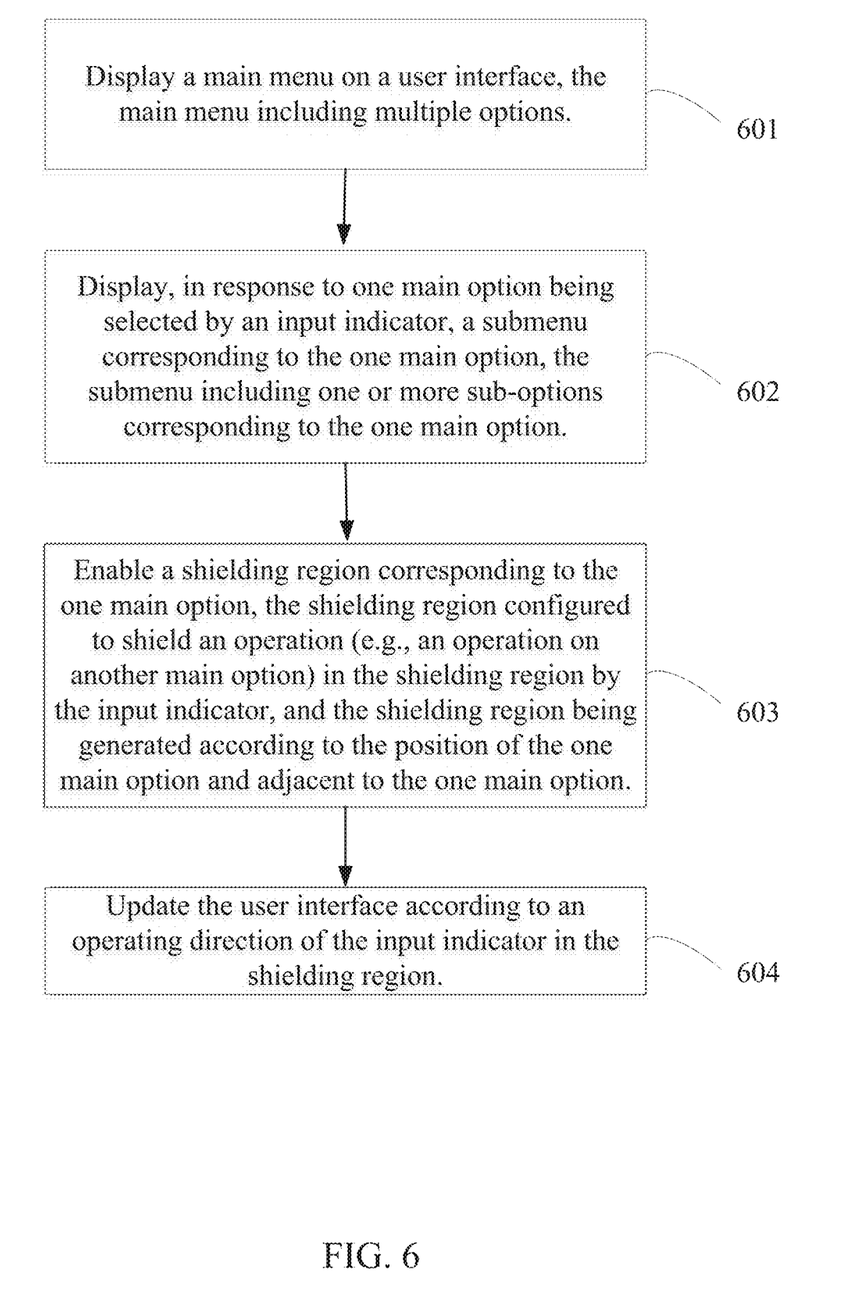
FIG. 6 is a flow chart of a second embodiment of a menu display method according to the present application.

Referring to FIG. 6, FIG. 6 is a flow chart of a second embodiment of a menu display method according to the present application. As shown in FIG. 6, the method includes: step 601 to step 604.

Step 601: Display a main menu on a user interface, the main menu including multiple main options.

Step 602: Display, in response to one main option being selected by an input indicator, a submenu corresponding to the one main option, the submenu including one or more sub-options corresponding to the one main option.

Step 603: Enable a shielding region corresponding to the one main option, the shielding region configured to shield an operation (e.g., an operation on another main option) in the shielding region by the input indicator, and the shielding region being generated according to the position of the one main option and adjacent to the one main option. Here, "shielding an operation" may include shielding all operations in the shielding region.

The above steps 601-603 are the same as the steps 201-203 in the first method embodiment shown in FIG. 2, and reference can be made to the above description. Details are not repeated herein again.

Step 604: Update the user interface according to an operating direction of the input indicator in the shielding region.

The operating direction of the input indicator may be determined according to a direction of the input indicator when the input indicator stops. No matter whether the movement trajectory of the input indicator is a straight line or a curve, when the input indicator moves to a destination position and stops, at this point, it can be directly determined, according to the direction of the input indicator, whether the operating direction of the input indicator has moved leftward, rightward, upward, or downward. Therefore, during implementation, the method embodiments of the present application do not exclude determining the operating direction by tracking and calculating the movement trajectory of the input indicator, but the former has advantages of being fast and having a small amount of calculation.

The method shown in FIG. 6 may add the operation of step 604 on the basis of the method shown in FIG. 2. Step 604 can give a more accurate response to the operation of the input indicator after the shielding region is enabled to render the shielding effect in step 603, so as to mitigate the problem of an actual operation of the user being neglected in a complete shielding process.

The implementation process of step 604 is explained below.

Step 604 may include:

disabling the shielding region when the operating direction of the input indicator matches a preset direction of the shielding region; and displaying, according to a current position of the input indicator, a submenu corresponding to a main option at which the current position is located.

In some embodiments, when the shielding region is disabled, the submenu may also be closed, and after the submenu is closed, according to a current position of the input indicator, a submenu corresponding to a main option at which the current position is located is displayed.

Here, when a shielding region is established, a corresponding direction for the shielding region can be set, and the preset direction of the shielding region refers to a movement direction indicating that an identifier of the input indicator leaves the shielding region.

The preset direction of the shielding region is explained below by taking the shielding region shown in FIG. 5 as an example.

The main menu and the submenu shown in FIG. 5 are laid out in a left-to-right arrangement manner, the shielding region 304 and the shielding region 305 are located above and below the main option 5, respectively, and in the embodiments of the present application, for menu display conditions of the main menu and the submenu in the left-to-right arrangement manner, the preset direction of the shielding region located above the main option can be set as leftward and downward; and the preset direction of the shielding region located below the main option can be set as leftward and upward.

Based on the same principle, for menu display conditions of the main menu and the submenu in a right-to-left arrangement manner, the preset direction of the shielding region located above the main option can be set as rightward and downward; and the preset direction of the shielding region located below the main option can be set as rightward and upward.

For menu display conditions of the main menu and the submenu in a top-to-bottom arrangement manner, the preset direction of the shielding region located to the left of the main option can be set as rightward and upward; and the preset direction of the shielding region located to the right of the main option can be set as leftward and upward.

For menu display conditions of the main menu and the submenu in a bottom-to-top arrangement manner, the preset direction of the shielding region located to the left of the main option can be set as rightward and downward; and the preset direction of the shielding region located to the right of the main option can be set as leftward and downward.

Figure 7:
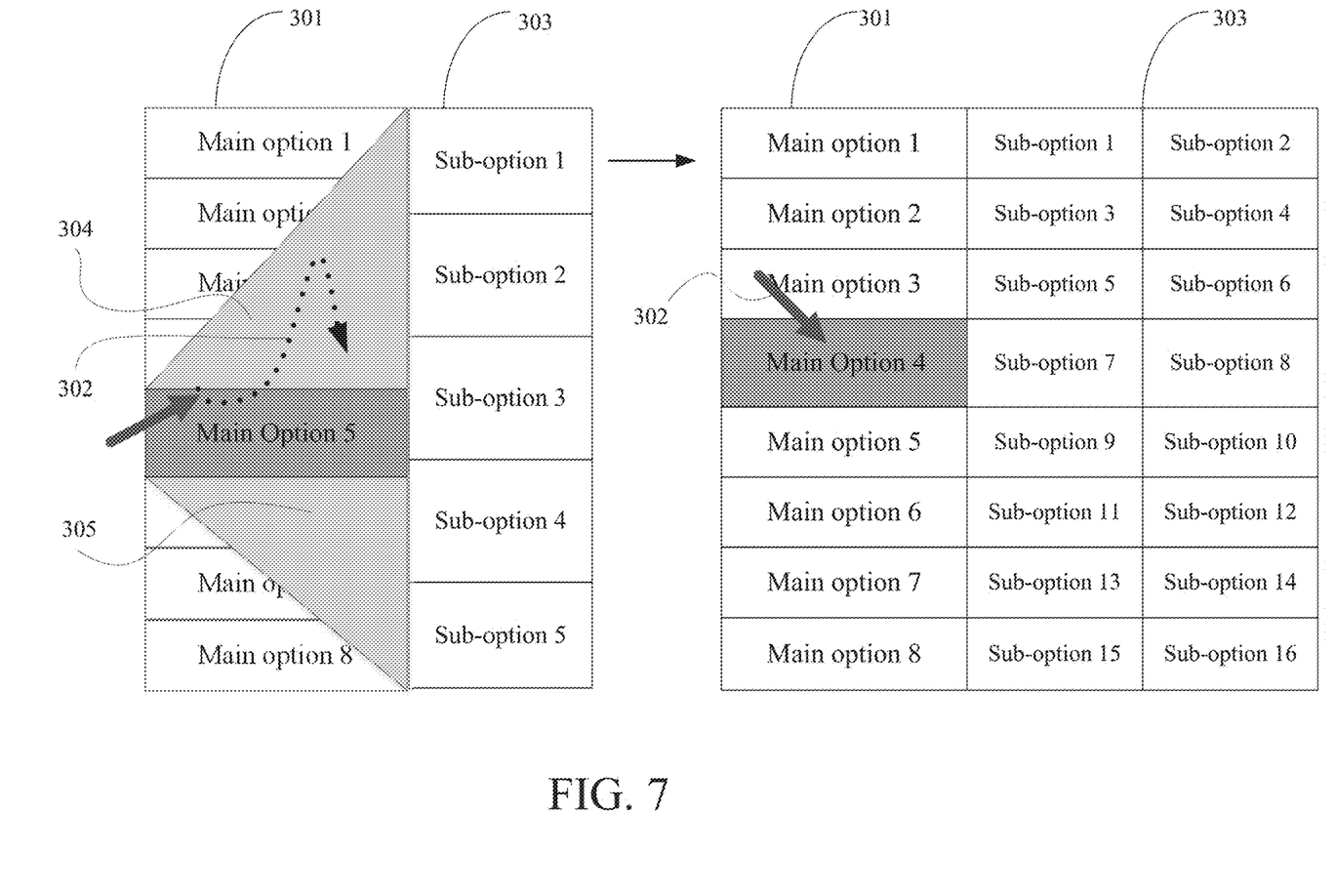
FIG. 7 is a schematic diagram of an implementation scenario of the second method embodiment shown in FIG. 6.

By taking FIG. 7 as an example, the preset direction of the shielding region 304 is leftward and downward; and the preset direction of the shielding region 305 is leftward and upward.

Then, when it is determined that the movement direction of the input indicator 302 in the shielding region 304 is leftward or downward, it indicates that the movement direction matches the preset direction, and at this point, the shielding regions 304 and 305 are disabled; the disabling refers to making the shielding regions no longer render the shielding effect, and during actual implementation, the disabling effect can be achieved by closing the shielding regions 304 and 305, and may also be achieved through back end logical processing.

In an actual application, to the user, both enabling and disabling of the shielding regions 304 and 305 may be invisible, and the shielding function of the shielding regions and disabling of the function are only implemented in the back end system. The illustration in FIG. 7 is merely to facilitate those skilled in the art to understand the solution, but the solution may not be necessarily implemented in this manner in an actual application.

After the shielding region 304 is disabled, according to a current position of the input indicator, the submenu corresponding to the main option at which the current position is located is displayed. As shown in FIG. 7, the movement direction of the input indicator in the shielding region 304 is downward, which matches the preset direction, and at this point, the shielding regions 304 and 305 are disabled; further, according to the current position (on the main option 4) of the input indicator, sub-options corresponding to the main option 4 are displayed in the submenu region, and as shown in FIG. 7, there are 16 sub-options related to the main option.

In some embodiments, after the submenu of the main option 4 is displayed, it is also feasible to continue to enable the shielding region corresponding to the main option 4 according to the method shown in FIG. 2. Reference may be made to the foregoing description for the implementation process, which is not repeated herein.

Compared with the prior art, the method described in the embodiments of the present application has the following advantages:

Compared with the "mouse trajectory slope calculation" technology in the prior art, the method described in the embodiments of the present application may only need to, when displaying a menu, start a shielding region related to a main option selected by the input indicator, and thus can avoid shielding the user's operations in the shielding region and avoid frequently responding to some aimless operations of the user. The method described in the embodiments of the present application does not need to track a mouse trajectory or calculate a slope, and therefore a response rate thereof is increased.

Compared with the "timer" technology in the prior art, the method described in the embodiments of the present application would render the shielding effect by enabling the shielding region corresponding to the main option, and in this way, the user, if wanting to initiate an operation on the submenu, will not trigger any operation when passing through the shielding region; therefore, some aimless operations of the user will not be frequently responded to. The method does not require timing and time delay will not occur.

Compared with the Amazon's smart menu technology in the prior art, the method described in the embodiments of the present application starts a corresponding shielding region only for the selected main option, while the shielding region is statically established and does not need to be dynamically established multiple times according to the position of the mouse cursor. Thus, compared with tracking the position of the mouse cursor in real time and dynamically establishing a triangular region multiple times according to the position of the mouse cursor as well as a movement delay of the cursor in the Amazon's smart menu, the method described in the embodiments of the present application can greatly simplify the construction algorithm of the shielding region, reduce the number of times of the shielding region establishment, and thus can reduce a response time of the menu display.

The present application further provides another menu display method, and the method is explained below with reference to FIG. 8.

Figure 8:
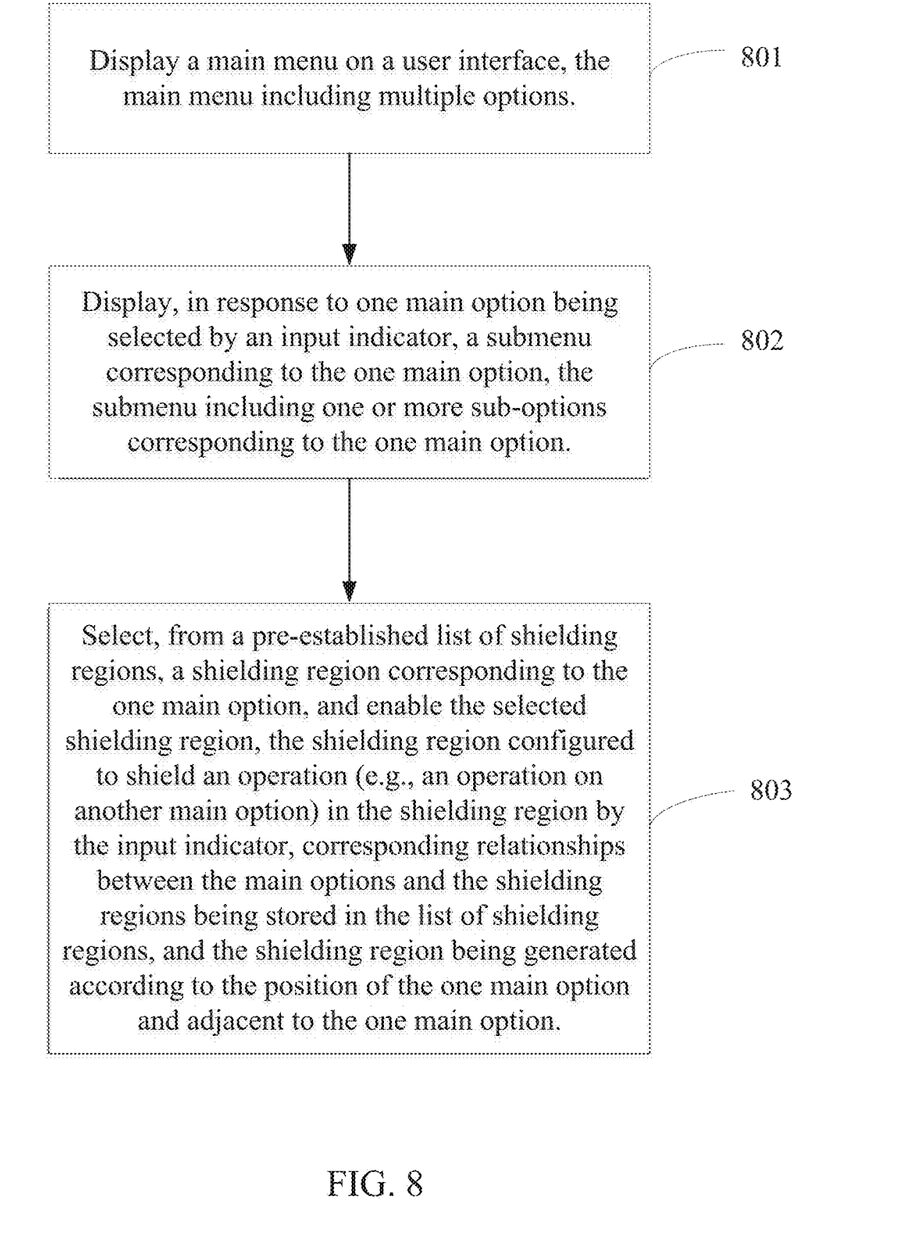
FIG. 8 is a flow chart of a third embodiment of a menu display method according to the present application.

Referring to FIG. 8, FIG. 8 is a flow chart of a third embodiment of a menu display method according to the present application. As shown in FIG. 8, the method includes:

step 801: displaying a main menu on a user interface, the main menu including multiple main options;

step 802: displaying, in response to one main option being selected by an input indicator, a submenu corresponding to the one main option, the submenu including one or more sub-options corresponding to the one main option; and step 803: selecting, from a pre-established list of shielding regions, a shielding region corresponding to the one main option, and enabling the selected shielding region, the shielding region configured to shield an operation (e.g., an operation on another main option) in the shielding region by the input indicator, corresponding relationships between the main options and the shielding regions being stored in the list of shielding regions, and the shielding region being generated according to the position of the one main option and adjacent to the one main option. Here, "shielding an operation" may include shielding all operations in the shielding region.

For implementation of step 801 and step 802, reference can be made to the related description about step 201 and step 202 in FIG. 2, and details are not repeated herein.

Next, step 803 is explained.

In implementation of the method shown in FIG. 8, a list of shielding regions needs to be pre-established, the list of shielding regions configured to record corresponding relationships between the main options in the main menu and shielding regions; one main option may correspond to one shielding region, and may also correspond to two shielding regions.

During implementation, the embodiments of the present application may establish the list of shielding regions in the following manner:

determining, according to a layout position of a main option on a page, a layout position of at least one shielding region adjacent to the main option; and recording a corresponding relationship between the main option and the layout position of the shielding region corresponding to the main option, and storing the corresponding relationship in the list of shielding regions.

During implementation, it is possible to only record, in the list of shielding regions, corresponding relationships between names (or other unique identifiers) of the main options and layout positions of the corresponding shielding regions relative to the main options.

In some menu interfaces, layout positions of the main menu and the submenu may be adjusted dynamically and are not constant; in this case, by using the above solution, a selected main option is determined at first, then a current layout position parameter of the main option can be acquired from a page layout parameter according to the name or another unique identifier of the main option, and next, the layout position of the shielding region can be determined based on a layout position of the shielding region relative to the main option recorded in the corresponding relationship.

During implementation, it is also possible to only record, in the list of shielding regions, corresponding relationships between layout positions of the main options and layout positions of the corresponding shielding regions relative to the main options.

In some menu interfaces, a layout position of a main option is constant, and in this case, a layout position of a shielding region corresponding to the main option can be determined only by looking for the corresponding relationship according to the layout position of the main option.

The advantage of menu display implemented with the method shown in FIG. 8 lies in that, by pre-establishing a list of shielding regions and storing the list of shielding regions, it builds a foundation for making a quick response to the operation of enabling the function of the shielding region subsequently. In this way, during the enabling, by directly reading the list, the amount of calculation of real-time calculation and creating a shielding region is greatly reduced, complexity of the menu display is simplified, and the response time can be greatly reduced.

Corresponding to the first method embodiment shown in FIG. 2, the present application further provides a corresponding apparatus, and the apparatus is explained below with reference to FIG. 9.

Figure 9:
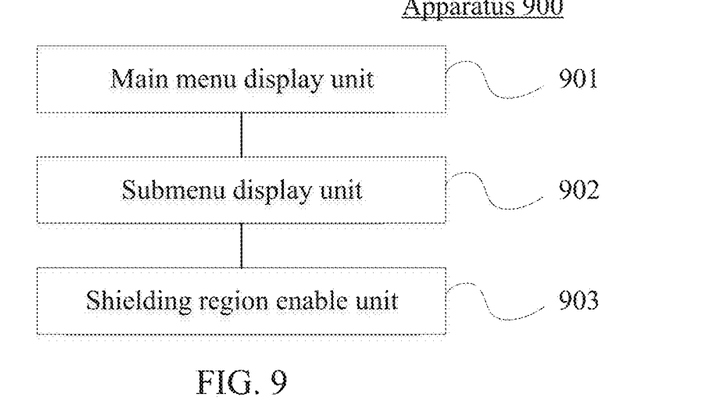
FIG. 9 is a structural diagram of a first embodiment of a menu display apparatus according to the present application.

Referring to FIG. 9, FIG. 9 is a structural diagram of a first embodiment of a menu display apparatus according to the present application. As shown in FIG. 9, the apparatus 900 includes: a main menu display unit 901, a submenu display unit 902, and a shielding region enable unit 903. Functions and connection relationships of units in the apparatus are explained below according to the working principle of the apparatus.

The main menu display unit 901 is configured to display a main menu on a user interface, the main menu including multiple main options.

The submenu display unit 902 is configured to display, in response to one main option being selected by an input indicator, a submenu corresponding to the one main option, the submenu including one or more sub-options corresponding to the one main option.

The shielding region enable unit 903 is configured to enable a shielding region corresponding to the one main option, the shielding region configured to shield an operation (e.g., an operation on another main option) in the shielding region by the input indicator, and the shielding region being generated according to the position of the one main option and adjacent to the one main option. Here, "shielding an operation" may include shielding all operations in the shielding region.

During implementation, the apparatus 900 may further include:

an interface update unit 904, configured to update the user interface (as shown by the dotted portion in FIG. 9) according to an operating direction of the input indicator in the shielding region.

The interface update unit 904 may include:

a disable subunit, configured to disable the shielding region when the operating direction of the input indicator matches a preset direction of the shielding region; and a submenu update subunit, configured to display, according to a current position of the input indicator, a submenu corresponding to a main option at which the current position is located.

The shielding region enabling unit 903 may include:

a selection and enable subunit, configured to select, from a pre-established list of shielding regions, a shielding region corresponding to the one main option, and enable the selected shielding region; or an establishment and enable subunit, configured to establish, according to a layout position of the one main option on a page and a layout position of another main option close to the one main option, a shielding region corresponding to the main option, and enable the established shielding region.

Corresponding to the third method embodiment shown in FIG. 8, the present application further provides a corresponding apparatus, and the apparatus is explained below with reference to FIG. 10.

Figure 10:
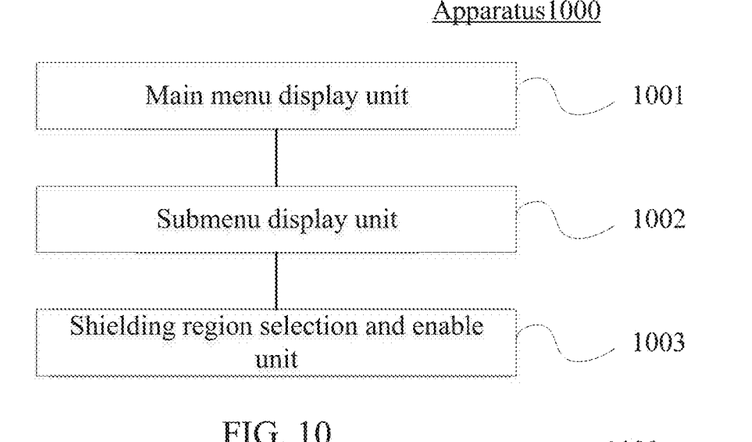
FIG. 10 is a structural diagram of a second embodiment of a menu display apparatus according to the present application.

Referring to FIG. 10, FIG. 10 is a structural diagram of a second embodiment of a menu display apparatus according to the present application. As shown in FIG. 10, the apparatus 1000 includes: a main menu display unit 1001, a submenu display unit 1002, and a shielding region selection and enable unit 1003. Functions and connection relationships of units in the apparatus are explained below according to the working principle of the apparatus.

The main menu display unit 1001 is configured to display a main menu on a user interface, the main menu including multiple main options.

The submenu display unit 1002 is configured to display, in response to one main option being selected by an input indicator, a submenu corresponding to the one main option, the submenu including one or more sub-options corresponding to the one main option.

The shielding region selection and enable unit 1003 is configured to select, from a pre-established list of shielding regions, a shielding region corresponding to the one main option, and enable the selected shielding region, the shielding region configured to shield an operation on another main option in the shielding region by the input indicator, corresponding relationships between the main options and the shielding regions being stored in the list of shielding regions, and the shielding region being generated according to the position of the one main option and adjacent to the one main option.

During implementation, the apparatus 1000 may further include: a shielding region list establishment unit;

the shielding region list establishment unit including:

a determination subunit, configured to determine, according to a layout position of a main option on a page, a layout position of at least one shielding region adjacent to the main option; and a recording subunit, configured to record a corresponding relationship between the main option and the layout position of the shielding region corresponding to the main option, and store the corresponding relationship in the list of shielding regions.

In addition, the present application further provides a menu display system, the system including: at least one memory and at least one processor, an operable instruction being stored in the at least one memory, the at least one processor being configured to read and execute the operable instruction in the at least one memory, and the operable instruction including:

displaying a main menu on a user interface, the main menu including multiple main options;

displaying, in response to one main option being selected by an input indicator, a submenu corresponding to the one main option, the submenu including one or more sub-options corresponding to the one main option; and enabling a shielding region corresponding to the one main option, the shielding region configured to shield an operation (e.g., an operation on another main option) in the shielding region by the input indicator, and the shielding region being generated according to the position of the one main option and adjacent to the one main option. Here, "shielding an operation" may include shielding all operations in the shielding region.

The at least one processor is further configured to read and execute the following operable instruction from the at least one memory:

updating the user interface according to an operating direction of the input indicator in the shielding region.

In another implementation, the following operable instruction is stored in the at least one memory:

displaying a main menu on a user interface, the main menu including multiple main options;

displaying, in response to one main option being selected by an input indicator, a submenu corresponding to the one main option, the submenu including one or more sub-options corresponding to the one main option; and selecting, from a pre-established list of shielding regions, a shielding region corresponding to the one main option, and enabling the selected shielding region, the shielding region configured to shield an operation (e.g., an operation on another main option) in the shielding region by the input indicator, corresponding relationships between the main options and the shielding regions being stored in the list of shielding regions, and the shielding region being generated according to the position of the one main option and adjacent to the one main option. Here, "shielding an operation" may include shielding all operations in the shielding region.

The at least one processor reads the operable instruction from the memory and executes the instruction.

Figure 11:
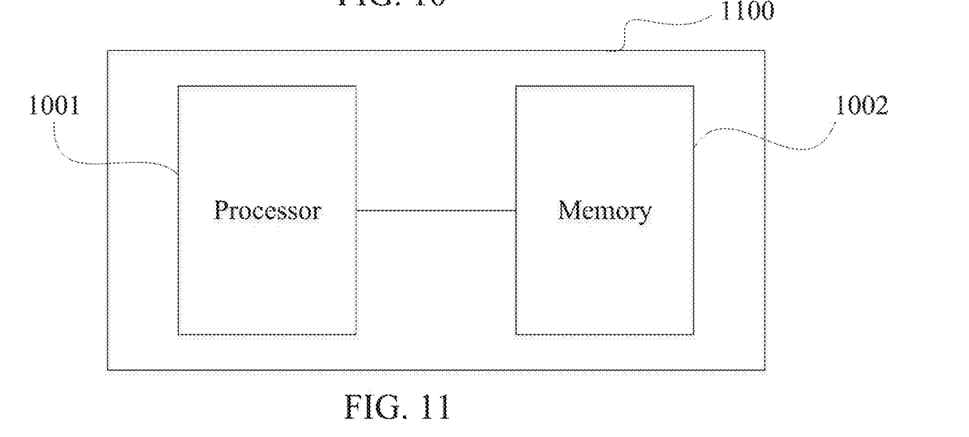
FIG. 11 is a structural diagram of a menu display system according to the present application.

Referring to the structural diagram of the system shown in FIG. 11, the system 1100 includes a processor 1101 and a memory 1102, where an operable instruction is stored in the memory, the instruction being described as above.

The memory may include a high-speed random access memory (RAM) and may also include a non-volatile memory, for example, one or more disk storage devices, flash memory devices, or other volatile solid-state storage devices.

Here, FIG. 11 gives explanation by taking an example in which the system includes one processor and a memory. In an actual application, the system may include multiple processors and one memory, may also include one processor and multiple memories, and in some embodiments, may also include multiple processors and multiple memories. Different processors may be connected to a same memory, and may also be connected to different memories. When the system includes multiple memories, different memories may be used to store the same operable instruction, and may also store different operable instructions, and the processor, as required, reads an instruction from a designated memory and executes the read instruction.

For example, when the system includes: two processors and two memories, the two memories store the same instruction, which is the instruction as described above, where one processor may provide a corresponding service for menu interface display of a certain website, and when the website has a corresponding request, the processor can read an operable instruction from the memory connected thereto and execute the instruction. Similarly, the other processor can provide a corresponding service for menu interface display of another website.

In some embodiments, in an actual application, different processors may also provide services for the same website, or provide services for the same software having a menu function, one processor serves as a main processor, and the other or several other processors may serve as a backup processor or backup processors.

The system provided in the embodiments of the present application, when a menu is displayed, enables a shielding region related to a selected main menu, and uses the shielding region to render the function of shielding an operation of the input indicator on a main option in the shielding region, such that the system does not respond to the operation of the input indicator in the shielding region, and thus can avoid the problem of interference with menu using of the user due to that the system frequently updates the submenu in response to the user's misoperation of unconsciously triggering other main options in the process of selecting a sub-option; therefore, precision of the menu response and the user experience can be significantly improved.

Further, the system may further determine whether to respond by analyzing an operating direction (e.g., upward, downward, leftward, or rightward) of the input indicator in the shielding region. In this way, a response can be quickly made for an operation, represented by the input indicator, of needing to leave the current main option to operate another main option, thereby avoiding the problem that a full-shielding operation in the shielding region completely neglects some actual requirements of the user.

Persons having ordinary skill in the art should be further aware that, units and algorithm steps of respective examples described in combination with the embodiments disclosed herein can be implemented by electronic hardware, computer software or a combination thereof. In order to clearly describe interchangeability between the hardware and the software, in the above description, compositions and steps of the examples have been generally described according to functions. Whether the functions are executed by hardware or software depends on specific applications and design constraints of the technical solution. Persons having ordinary skill in the art can implement the described functions by using different methods for each specific application, but such implementation should not be considered as beyond the scope of the present application.

Steps of the method or algorithm described in combination with the embodiments disclosed herein can be implemented by hardware, a processor-executed software module, or a combination thereof. The software module may be built in a random access memory (RAM), a memory, a read only memory (ROM), an electrically programmable ROM, an electrically erasable programmable ROM, a register, a hard disk, a removable disk, a CD-ROM, or any other forms of storage mediums well-known in the technical field.

The specific implementations described above describe the objectives, the technical solutions, and beneficial effects of the present application in further detail. It should be understood that the above descriptions are merely specific implementations of the present application, but are not intended to limit the protection scope of the present application. Any modification, equivalent replacement, and improvement made without departing from the spirit and principle of the present application shall all fall within the protection scope of the present application.

The invention claimed is:

1. A menu display system, comprising: at least one memory and at least one processor, operable instructions stored in the at least one memory, the at least one processor being configured to read and execute the operable instructions in the at least one memory, and the operable instructions configured to, when executed, cause the at least one processor to perform steps comprising:
  displaying a main menu on a user interface, the main menu comprising multiple main options;
  displaying, in response to one main option being selected by an input indicator, a submenu corresponding to the one main option, the submenu comprising one or more sub-options corresponding to the one main option;
  enabling a shielding region corresponding to the one main option, the shielding region configured to shield an operation on another main option in the shielding region by the input indicator, and the shielding region being generated according to the position of the one main option and adjacent to the one main option; and
  when the input indicator moves within the shielding region, disabling the shielding region when an operating direction of the input indicator matches a preset direction of the shielding region.

2. The menu display system according to claim 1, wherein the operable instructions configured to, when executed, cause the at least one processor to further perform:

updating the user interface according to the operating direction of the input indicator in the shielding region.

3. A menu display method, comprising:
displaying a main menu on a user interface, the main menu comprising multiple main options;
displaying, in response to one main option being selected by an input indicator, a submenu corresponding to the one main option, the submenu comprising one or more sub-options corresponding to the one main option;
enabling a shielding region corresponding to the one main option, the shielding region configured to shield an operation on another main option in the shielding region by the input indicator, and the shielding region being generated according to the position of the one main option and adjacent to the one main option; and
when the input indicator moves within the shielding region, disabling the shielding region when an operating direction of the input indicator matches a preset direction of the shielding region.

4. The menu display method according to claim 3, further comprising:
updating the user interface according to the operating direction of the input indicator in the shielding region.

5. The menu display method according to claim 4, wherein the updating the user interface according to the operating direction of the input indicator in the shielding region comprises:
displaying, according to a current position of the input indicator, a submenu corresponding to a main option at which the current position is located.

6. The menu display method according to claim 3, wherein the enabling a shielding region corresponding to the one main option comprises:
selecting, from a pre-established list of shielding regions, a shielding region corresponding to the one main option, and enabling the selected shielding region; or
establishing, according to a layout position of the one main option on a page and a layout position of another main option close to the one main option, a shielding region corresponding to the one main option.

7. The menu display method according to claim 3, wherein the shielding region comprises: at least one region adjacent to the one main option.

8. The menu display method according to claim 3, wherein
the shielding region is a triangular region or a fan-shaped region.

9. The menu display method according to claim 3, wherein
the main menu and the submenu include webpage elements.

10. The menu display method according to claim 3, wherein
the input indicator comprises: a mouse cursor or a pointer of a motion-sensor-based input device.

11. A menu display method, comprising:
displaying a main menu on a user interface, the main menu comprising multiple main options;
displaying, in response to one main option being selected by an input indicator, a submenu corresponding to the one main option, the submenu comprising one or more sub-options corresponding to the one main option;
selecting, from a pre-established list of shielding regions, a shielding region corresponding to the one main option;
enabling the selected shielding region, the shielding region configured to shield an operation on another main option in the shielding region by the input indicator, corresponding relationships between the main options and the shielding regions being stored in the list of shielding regions, and the shielding region being generated according to the position of the one main option and adjacent to the one main option; and
when the input indicator moves within the shielding region, disabling the shielding region when an operating direction of the input indicator matches a preset direction of the shielding region.

12. The menu display method according to claim 11, further comprising:
establishing the list of shielding regions in the following manner:
determining, according to a layout position of a main option on a page, a layout position of at least one shielding region adjacent to the main option; and
recording a corresponding relationship between the main option and the layout position of the shielding region corresponding to the main option, and storing the corresponding relationship in the list of shielding regions.

13. A non-transitory computer-readable storage medium configured with instructions executable by one or more processors to cause the one or more processors to perform operations comprising:
displaying a main menu on a user interface, the main menu comprising multiple main options;
displaying, in response to one main option being selected by an input indicator, a submenu corresponding to the one main option, the submenu comprising one or more sub-options corresponding to the one main option;
enabling a shielding region corresponding to the one main option, the shielding region configured to shield an operation on another main option in the shielding region by the input indicator, and the shielding region being generated according to the position of the one main option and adjacent to the one main option; and
when the input indicator moves within the shielding region, disabling the shielding region when an operating direction of the input indicator matches a preset direction of the shielding region.

14. The non-transitory computer-readable storage medium of claim 13, wherein the enabling a shielding region corresponding to the one main option comprises:
selecting, from a pre-established list of shielding regions, the shielding region corresponding to the one main option; and
enabling the selected shielding region, corresponding relationships between the main options and the shielding regions being stored in the list of shielding regions.

15. The non-transitory computer-readable storage medium of claim 13, wherein the shielding region covers at least two substantially triangular regions on opposite sides of the one main menu option.

16. The non-transitory computer-readable storage medium of claim 15, wherein:
the one main menu option is substantially rectangular;
one side of the triangular region substantially overlaps with one side of the one main menu option; and
one vertex of the triangular region away from the one side is a vertex of one of the sub-options.

17. The non-transitory computer-readable storage medium of claim 16, wherein:
the one or more sub-options are each substantially rectangular; and the vertex of one of the sub-options is a corner vertex of the one of the sub-options.

18. The menu display system of claim 1, wherein the shielding region covers at least two substantially triangular regions on opposite sides of the one main menu option.

19. The menu display system of claim 18, wherein:
the one main menu option is substantially rectangular;
one side of the triangular region substantially overlaps with one side of the one main menu option; and
one vertex of the triangular region away from the one side is a vertex of one of the sub-options.

20. The menu display system of claim 19, wherein:
the one or more sub-options are each substantially rectangular; and
the vertex of one of the sub-options is a corner vertex of the one of the sub-options.

21. The menu display method of claim 3, wherein the shielding region is configured to shield all operations in the shielding region.

* * * * *